United States Patent [19]

Cotten

[11] 4,152,817
[45] May 8, 1979

[54] METHOD OF JOINING PLASTIC PIPE TO OTHER PIPE

[76] Inventor: Roger C. Cotten, 299 Vincent St., Metairie, La. 70002

[21] Appl. No.: 872,837

[22] Filed: Jan. 27, 1978

Related U.S. Application Data

[63] Continuation-in-part of Ser. No. 728,232, Sep. 30, 1976, abandoned.

[51] Int. Cl.² ............... B21D 53/00; B21K 29/00; B23P 15/26
[52] U.S. Cl. ............................. 29/157 R; 29/437; 29/509; 29/523; 285/177; 285/238; 285/386
[58] Field of Search .............. 29/157 R, 509, 523, 29/437; 264/249, 229; 285/177, 238, 354, 386

[56] References Cited

U.S. PATENT DOCUMENTS

| 1,951,860 | 3/1934 | Cowles | 285/174 X |
| 3,687,492 | 8/1972 | Leopold et al. | 285/386 X |

FOREIGN PATENT DOCUMENTS

| 57253 | 7/1966 | Fed. Rep. of Germany | 285/174 |
| 877735 | 9/1961 | United Kingdom | 285/174 |

*Primary Examiner*—Charlie T. Moon

*Attorney, Agent, or Firm*—Wofford, Fails and Zobel

[57] ABSTRACT

Method and apparatus for joinder of plastic conduit to a second conduit characterized by forming a holding means on the end of the second conduit with which the plastic conduit is to be connected, emplacing about a tubular end of plastic conduit a fitting that is adapted to be fitted against the holding means and having an interiorly protruding annular flange, or shoulder, for pulling a washer and the tubular end into sealing engagement with the end of the second conduit, heating the tubular end of the plastic conduit to its softening temperature, forming a washer on the plastic conduit such that the washer fits concentrically interiorly of the fitting, the washer having shoulders stronger than the walls of the conduit, and tightening the fitting onto the holding means with the washer disposed interiorly of the fitting and with the end of the second conduit embedded in compressed, tight, sealing relationship with the washer. In a preferred embodiment the washer is formed as a shaped piece by compressing and accordioning the heated, softened tubing walls back over and reinforcing the heating line between the heated and cold tubing wall. This preferred embodiment thereby prevents breaking of the tubing along a line of weakness adjacent the heating line.

2 Claims, 9 Drawing Figures

METHOD OF JOINING PLASTIC PIPE TO OTHER PIPE

CROSS-REFERENCES TO RELATED APPLICATIONS

This application is a continuation-in-part of application Ser. No. 728,232, filed Sept. 30, 1976, now abandoned with the same inventor and same title.

CROSS-REFERENCES TO RELATED APPLICATIONS

This application is a continuation-in-part of application Ser. No. 728,232, filed Sept. 30, 1976, now abandoned with the same inventor and same title.

BACKGROUND OF THE INVENTION

1. Field of the Invention

This invention relates to joinder of plastic conduit to other conduit. More particularly, this invention relates to method and apparatus for effecting joinder of plastic conduit, or pipe, to other conduit, or pipe, such as of different material.

2. Description of the Prior Art

The prior art has seen the introduction of a wide variety of different types of conduits and method of joining of the conduits, whether they were the same or of dissimilar materials. A large improvement in plumbing technology was made when copper pipe began to be employed. The price of copper has risen so dramatically, however, that it is economically infeasible in many applications. Its successor was plastic which had some advantages even over the copper pipe and was more economical. One recent innovation that is seeing increasingly widespread use is the use of plastic conduit such as butylene pipe, or tubing, in low pressure applications.

One of the problems that has plagued the industry has been joinder of the plastic pipe to the other types of conduit, such as the wrought iron pipe, frequently employed in home construction. The prior art has seen different approaches ranging from use of ferrule fittings to the use of preformed ends to be joined with the plastic pipe, such as described in U.S. Pat. No. 3,831,983, the closest art of which I am aware. In that patent, the preformed end is fused onto the end of the plastic conduit and thereafter forced interiorly of and in swaging relationship with carefully preformed shoulders to form a seal. While this method has advantages over the prior art, it was relatively expensive, since the fittings had to be so carefully prepared. Also, application in the field required stocking a relatively complete range of sizes that had been carefully prepared at the factory.

Additional references include the U.S. Pat. Nos. 1,951,860 and 3,687,492, as well as British patent 877,735 and East German document number 57253. U.S. Pat. No. 1,951,860 is a method for making unions for metal tubing and is not really very pertinent. U.S. Pat. No. 3,684,492 does disclose the use of folded plastic tubing ends in forming a service pipe coupling joint that is really not very pertinent to the method of this invention. The British Pat. No. 877,735, however, is much more pertinent to the broad aspects of merely heating the end of the tube and forming an integral washer with the tubing wall. It does not, however, show or make obvious the improved concept of forming the shaped piece in the washer cavity so as to prevent breakage of the tubing near the heating line and to provide an inherent springingness that prevents loosening of fittings. Similarly, the East German patent does not anticipate or make obvious the method of this invention, as defined by the appended claims.

Thus, it can be seen that the prior art has not been totally successful in providing an inexpensive method or apparatus for effecting joinder of plastic conduit to other conduit while retaining the sealing, the preventing of breakage of the conduit adjacent the heating line and providing the inherent springingness needed to prevent loosening of a fitting used; and otherwise obviating the disadvantages of the prior art structure.

SUMMARY OF THE INVENTION

Figure 1:
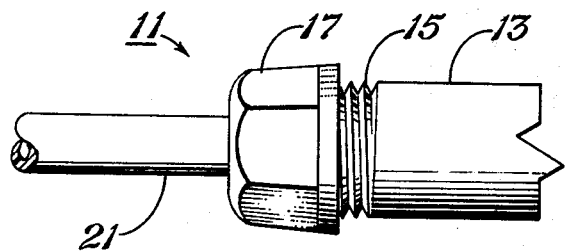
FIG. 1 is a partial side elevational view showing the plastic conduit combination connected with second conduit of a different material in accordance with this invention.
Figure 2:
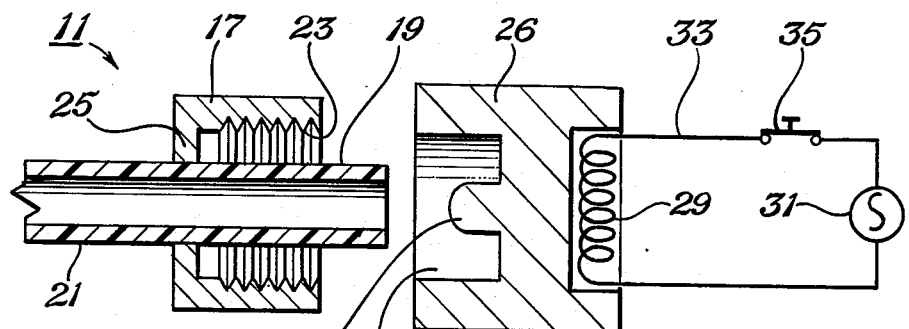
FIG. 2 is a partial cross-sectional view, partly schematic, showing diagrammatically method and apparatus for starting to form the integral washer and tubing in accordance with the embodiment of FIG. 1.
Figure 3:
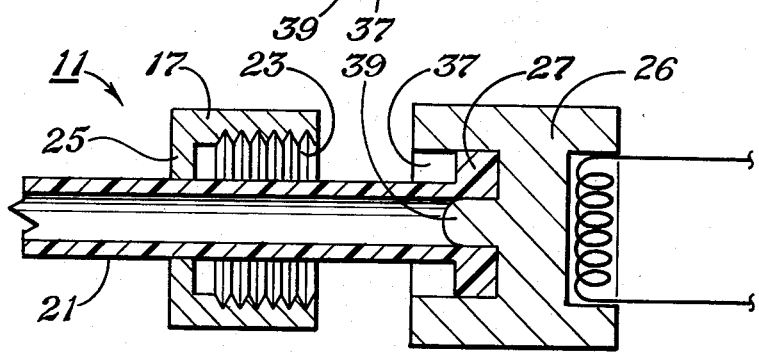
FIG. 3 is a partial cross-sectional view, partly schematic, showing the embodiment of FIG. 2 progressed to the second stage where the washer is being formed integrally with the tubing wall.

Accordingly, it is an object of this invention to provide an inexpensive method and apparatus for effecting joinder of plastic conduit to other conduit while retaining the sealing, preventing breakage of the conduit adjacent the heating line and providing the inherent springingness needed to prevent loosening of a fitting that is used for holding the two together; and otherwise obviating the disadvantages of the prior art structures.

It is a specific object of this invention to provide apparatus, method, and the combination, such that the plastic conduit and integrally formed washer, or shaped piece, can be formed in the field, and employed in the field with a single type fitting, even though the fitting may have a shoulder that does not extend interiorly completely to the exterior wall of the tubing: yet, achieves the object delineated hereinbefore and does not require a large plurality of pre-cut lengths and array of sizes from a factory or the like as has been the practice in the prior art.

These and other objects will become apparent from the descriptive matter hereinafter, particularly when taken in conjunction with the appended drawings.

In accordance with one embodiment of this invention, there is provided a method of joining plastic conduit to a second conduit, as of another material, and characterized by a multi-step process as follows. First, a holding means is formed on the end of the second conduit with which the plastic conduit is to be connected. A fitting that is adapted to be fitted against the holding means and that has an interiorly protruding annular flange for pulling a washer and the tubular end of the plastic conduit into engagement with the end of the second conduit is emplaced about the tubular end of the plastic conduit. A tubular end of the plastic conduit is heated to its softening temperature and a washer is formed from and on the softened tubular end of the plastic conduit. The washer is formed of the plastic conduit so as to be integral therewith and fit concentrically interiorly of the fitting. The washer has shoulders that are stronger than the walls of the conduit. Finally, the fitting is tightened into holding engagement with the holding means so as to pull the washer compressedly into a tight sealing relationship with the end of the second conduit, or sealingly embed the end of the second conduit in the washer.

In preferred embodiments, the washer is formed by inserting the softened tubular end of the plastic conduit into a mold of predetermined dimensions. The mold may comprise a heating iron that can be readily carried by the plumber or the like into the field for use on location to facilitate making repairs or finishing interconnection of a plumbing network, or system. On the other hand, the mold may comprise a mold at the factory complete with a mold with its cavity, a center piece, or insert pin for retaining the internal diameter correct and an annular piston for compressing the washer into a shaped piece as discussed in more detail hereinafter. In this preferred embodiment, the softened tubing wall, sometimes referred to in plural as walls, is accordioned back over itself and the heating line formed between the heated softened tubing wall and the unsoftened tubing wall and compressed into a shaped piece in the mold cavity between the cavity walls and the annular piston and center piece. In this way, the accordioned walls form an inherent springingness that retains a frictionally tightened fitting in place; and the shaped piece serves to structurally reinforce any weakness that tends to form along the heating line and alleviates problems with breakage of the conduit adjacent the heating line.

In another embodiment of the invention, there is provided a plastic conduit combination that is adapted for being connected with the second conduit. The combination includes a plastic conduit, per se, that has a fitting disposed concentrically about its tubular end and adapted to matingly engage a holding means on the second conduit. The fitting has radially interiorly protruding shoulder for pulling a washer into sealing engagement with the end of the second conduit. The tubular end of the plastic conduit has a washer formed integrally onto its tubular end, the washer being adapted to fit interiorly of the fitting and intermediate a shoulder on the fitting and the end of the second conduit. The washer is homogeneous with the tubular end, stronger than the walls of the plastic conduit. The washer is adapted to sealingly receive, or have sealingly embedded therein, the end of the second conduit to form a sealing interconnection with the end of the second conduit when compressed thereagainst by the shoulder of the fitting when the fitting is tightened against the holding means of the second conduit.

DESCRIPTION OF PREFERRED EMBODIMENTS:

The descriptive matter hereinafter will be directed toward joining of substantially cylindrical tubular conduit, normally one of which will be thermoplastic and have a fitting. The term "conduit" is employed herein as synonymous with pipe, tubing, hose and the like.

Typical of the thermoplastic materials of which the respective conduit described hereinafter is formed will comprise materials like polyacrylonitrile butadiene styrene copolymers (ABS), polyethylene, polyvinyl chloride, polypropylene, polycarbonate, and other well known thermoplastic materials. Particularly preferable is the polybutylene type of thermoplastic conduit, such as is available from Southern Chemical Company, Inc., Metairie, La., 70002.

Referring to FIGS. 1–4, there is illustrated a plastic conduit combination 11 for being connected with a second conduit 13. As illustrated, the second conduit 13 is formed of a different material, such as wrought iron, steel or copper alloy, or the like. The second conduit 13 has a holding means, such as the illustrated threaded section, or thread, 15. A fitting 17 is disposed concentrically about the tubular end 19 of a plastic conduit 21. The fitting 17 is adapted to matingly engage the holding means for pulling the two conduits together. Specifically, the fitting 17 has an interiorly threaded section, or thread, 23 that mates with the threaded section 15. The fitting 17 has radially interiorly protruding flange, or shoulder, 25 for pulling a washer into sealing engagement with the end of the second conduit 13.

The heart of this invention lies in the stark simplicity of forming a washer 27 that is integral and homogeneous with the tubular end 19 of the conduit 21. Because of the stark simplicity, the revolutionary impact of the invention is not readily appreciated. The high degree of commercial acceptance and facts showing this revolutionary impact is recited later hereinafter. It is sufficient to note at this point that the end 19 of the conduit 21 is heated by being pushed interiorly of a heated mold 26. In practice, the heated mold will be similar to the portable mold described in my earlier filed co-pending application entitled "Joinder of Plastic Conduit," Ser. No. 634,144, filed Nov. 21, 1975, now Pat. No. 3,994,515. Such portable heating irons may have all in one unit a plurality of respective molds sized to fit the different sizes of conduit that are conventionally employed by the operator. As illustrated herein, however, the mold 26 is illustrated schematically, with the heating element being shown by the coil 29. The heating element is connected respectively with a source of electrical current, shown as an alternating current source 31. The connection is by way of suitable electrical circuit 33 having therein a switch 35. If desired, of course, the switching action may be effected by simply plugging into an ordinary house current or the like to eliminate the requirement for the switch 35. Moreover, if desired, suitable automatic controls such as thermostats and automatic switches, may be employed to prevent overheating and the like. Such controls maintain the temperature at that required to obtain softening of the plastic conduit 21. Normally, a temperature within the range of 350°–650° F.; for example, 450°–550° F.; is adequate.

In any event, the end 19 is inserted within a cavity 37 of predetermined dimensions within the heated mold 26. As illustrated, the cavity 37 forms the washer 27 of predetermined interior and exterior dimensions. The interior dimensions are normally those of the plastic conduit 21. The exterior dimensions are such that the washer 27 will fit concentrically interiorly of the interior walls, or threaded section 23, of the fitting 17. A protruding shaft portion 39 maintains the internal dimensions accurate. Consequently, the softened plastic tends to roll back upon itself and fusingly merge with the exterior walls of the conduit 21 to form an integral and relatively homogeneous, at least in the engineering sense, washer.

Figure 5:
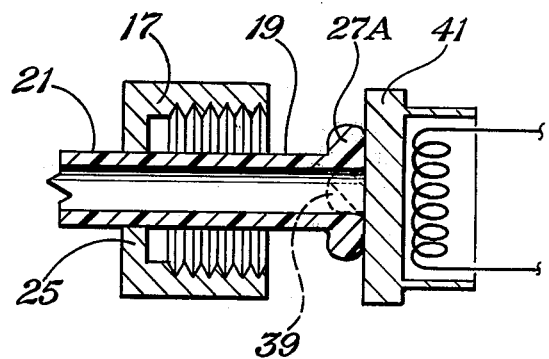
FIG. 5 is a partial cross-sectional view of another embodiment of this invention employing a plate heater, rather than the mold, for forming the washer and relying on inherent property of the thermoplastic of rolling back on and adhering to itself to form the washer.
Figure 6:
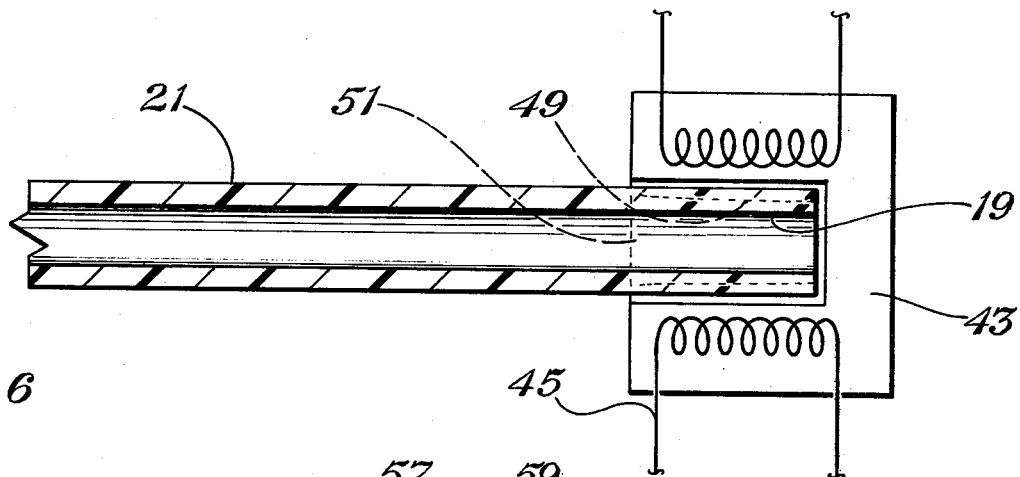
FIG. 6 is a partial cross-sectional view, partly schematic, showing the heating of an end of the tubing for forming the washer in the form of a shaped piece integrally with the end of the tubing, in accordance with a preferred embodiment of this invention.

In fact, referring to FIG. 5, there is illustrated an interesting phenomena that has been obeserved. As the end 19 of the conduit 21 is imposed upon a heated iron 41, it heats to its softening temperature and tends to roll back and to form a relatively homogeneous washer 27A, whether or not there is an accurately delineated mold cavity 37. Thus, it becomes possible to employ a very economical and exceptionally flexible heating and forming of the washer in the field, particularly if the shaft portion 39 is not vital to maintain an interior bore exact.

The washer 27 is structurally stronger than the walls of the conduit 21. Since it is integrally formed therewith, there is no problem with differential expansion because of changes in temperature. Thus, such a joinder becomes ideal for use with hot water pipes and the like.

In operation, the plastic conduit 21 is joined to a second conduit 13, as of another material, as set forth in a plurality of method steps as follows.

A. The holding means, such as threads 15, is formed on the end of the second conduit 13 with which the plastic conduit is to be connected.

B. The fitting 17 is emplaced about the tubular end 19 and on the plastic conduit 21.

C. The tubular end 19 of the plastic conduit 21 is heated to its softening temperature by insertion within the cavity 37 of the heated mold 26. As the tubular end 19 encounters the hot walls of the mold 26, the plastic, such as polybutylene, rolls back upon itself to form an integral and relatively homogeneous washer 27 that, after cooling, is stronger than the walls of the conduit 21. Because of the cavity 37, the dimensions of the washer 27 are controlled exactly to predetermined interior and exterior dimensions. If a non-cavity type heating iron 41 is employed, the washer 27A is formed to less exact dimensions, but can still be adequate structurally for drawing the washer 27A into tight sealing relationship with the end of the conduit 13. In any event, the washer 27 (or 27A) fits concentrically interiorly of the fitting 17. The washer 27 and the heated end of the conduit 21 are withdrawn and allowed to cool as desired.

Figure 4:
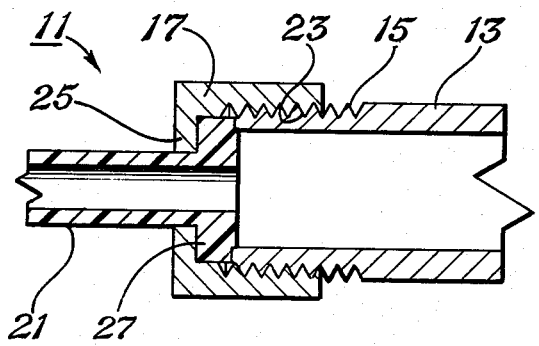
FIG. 4 is a partial cross-sectional view of the embodiment of FIG. 1.

Thereafter, the fitting 17 is pulled into holding relationship with the thread 15, as by screwing thereonto. The fitting is tightened until the washer 27 sealingly receives the end of the conduit 13. The sealing relationship is illustrated in FIG. 4 in that the end of the conduit 13 is actually embedded in, or compressed into, the washer 27. This is a dramatically different concept from the use of swage, or frusto-conical shaped and carefully formed ferrules be they formed of metal or the same material as the plastic conduit. The difference can be readily appreciated from consideration of the wide variety of inner bores of the different types of conduit 13, each of the inner bores requiring a separate ferrule that is carefully dimensioned for it or, if a wide ferrule is employed, a carefully controlled slope to allow the frictional requirements to be mated to the sealing relationships of the respective materials. In this invention, on the other hand, the flat compressible surface of the washer 27 will accommodate a wide variety of different sized inner bores of the second conduit 13 without critically dimensioned slopes of side walls and the like. In any event, the fitting 17 is tightened so as to hold the washer interiorly of the fitting and with the end of the second conduit compressed into tight sealing relationship with the washer.

As will be appreciated, this invention may be employed with widely different types of second conduits. It is preferable that the material of which the second conduit 13 is manufactured have a hardness that is somewhat greater than that of the plastic conduit 21 in order to facilitate making the interconnection. All of the conventional building industry materials, such as wrought iron pipe, steel tubing, brass tubing, other copper alloy tubing, and the like, all have the requisite greater hardness so as to be satisfactory. It is possible, however, to employ conduit 13 of the same material as the plastic conduit 21 if sufficient length of threaded sections 15 and 23 are employed to enable obtaining the desired tight holding and sealing relationship between the respective conduit ends. Ordinarily, however, joinder of similar plastic conduit is more readily facilitated by my invention which has been described and claimed in my hereinbefore referenced and co-pending patent application "Joinder of Plastic Conduit," Ser. No. 634,144, now issued as U.S. Pat. No. 3,994,515.

Figure 7:
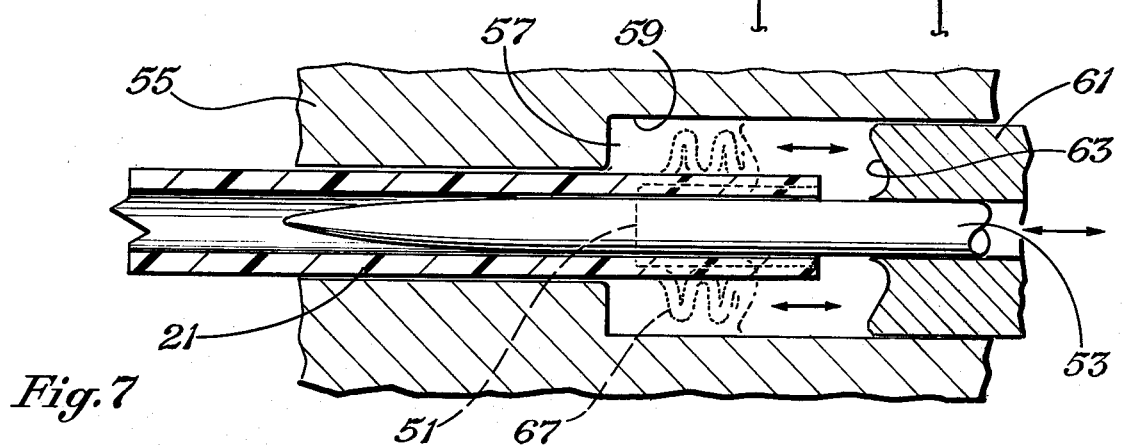
FIG. 7 is a partial cross-sectional view of the apparatus, and illustrating diagrammatically the method, in accordance with this invention for forming the shaped piece type washer integrally with the tubing wall.

Referring to FIG. 6–9 there is illustrated a preferred embodiment of this invention. Therein, the tubular end 19 of the plastic conduit 21 is heated rapidly within a heater 43. The heater 43 may be an electric heater, as illustrated by the schematic representation 45, or it may be of other type. In any event, it is imperative that the end 19 be heated to its softening temperature such that the wall of the conduit 21 can be accordioned back over itself as illustrated in FIG. 7. Preferably, the exterior portion is heated rapidly such that there is an interface, illustrated by dashed line 49, the exterior of which is softened conduit and the interior of which is conduit wall that has not yet reached its softening temperature before it is inserted within the mold as illustrated in FIG. 7. There is formed a heating line, illustrated by the dashed line 51 between the heated end that will reach its softened state, or condition before the washer is formed and the unsoftened remainder of the tubing wall to the left of the heating line in FIG. 6.

Figure 8:
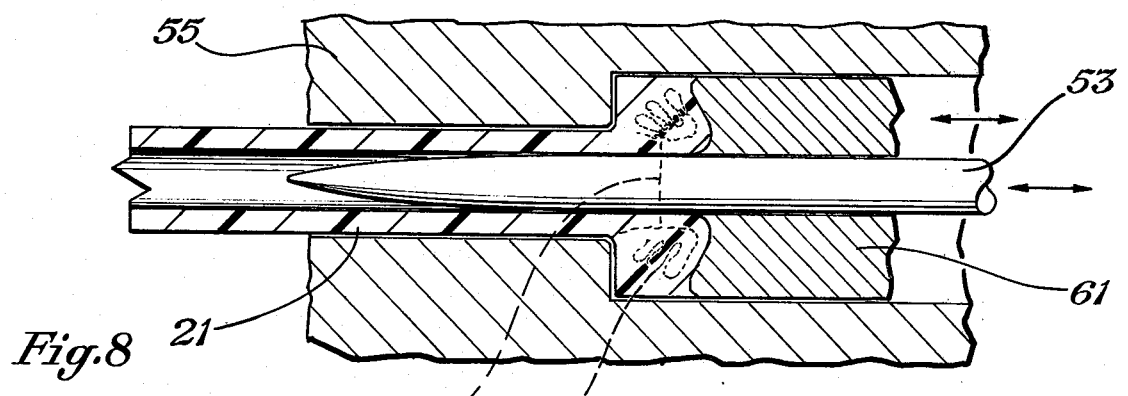
FIG. 8 is a partial cross-sectional view of FIG. 7 progressed further to form the washer.
Figure 9:
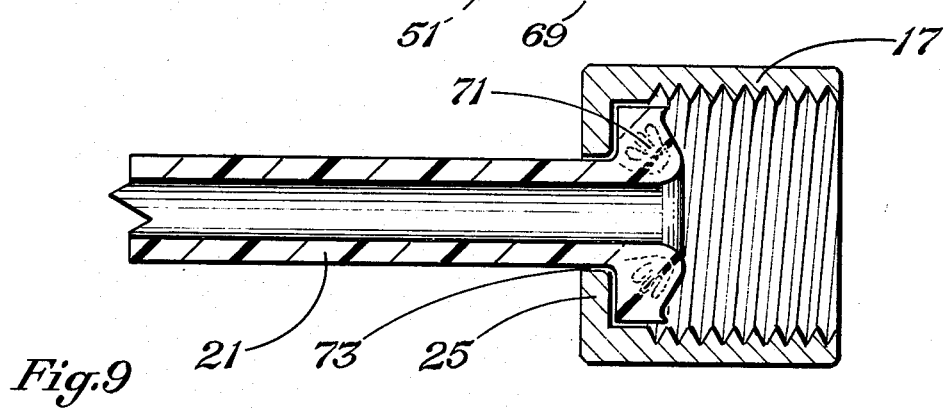
FIG. 9 is a partial cross-sectional view of the tubing, shaped piece and fitting in accordance with an embodiment of this invention.

Referring to FIG. 7, a center piece, or pin 53 is inserted interiorly of the conduit after it has been emplaced within the mold 55. Tubing wall 21 is grippingly held in place so as to resist longitudinal movement in the mold 55. The mold 55 may be formed by solid metallic walls such as stainless steel, aluminum or the like. In any event, the mold cavity 57 is defined by interior walls 59 of the desired exterior shape of the washer, or shaped piece, that is to be formed. An annular piston 61 is inserted within the cavity 57 for compressing the walls longitudinally of the center piece 53 to form the washer. The end of the annular piston 61 has a shape 63 for forming the desired final shaped piece when the washer is compressed as illustrated in FIG. 8. The annular piston 61 is moved longitudinally of the center piece 53 to accordion the walls, or wall, illustrated by dashed line 67. The rapid heating of the exterior of the tubing wall insures that the relatively thin and slowly being heated to its softening temperature internal portion begins the accordioning movement before it reaches the complete softening temperature. Almost simultaneously with the accordioning, it will become softened so as to be accordioned and compressed back over itself and over the heating line 51. As illustrated in FIG. 8, the washer has the accordioned wall loops 69 for forming the inherent springingness, yet the shaped piece is compressed back over and encompasses the heating line 51 such that any weakness that otherwise tends to form along the heating line in a conduit is reinforced and no longer exists as a separate weak point. It is theorized, although the theory is not pertinent to this invention, that there is formed a drawing groove through inadvertent movement of the cold wall adjacent the heating line that normally causes washers and the like to break off. At least that was the experience with the early embodiments of this invention and resulted in resorting to this improvement described in this preferred embodiment herein. After the washer is formed into place, as by allowing to cool about 5 seconds, the center piece 53 is withdrawn, the annular piston 61 is withdrawn and the mold 55 is moved from about the integrally formed shaped piece, or washer, and the tubing wall 21. Subsequently, the fitting 17 is moved up about the shaped piece 71. One advantage of this invention is that the shaped piece 71 is so strong structurally that the interiorly protruding shoulder 25 of the fitting 17 does not have to go all the way to the tubing wall 21, but may have an annular gap 73 without adverse consequences. Expressed otherwise, in the prior art, washers that are rolled onto the ends are so weak that they cannot tolerate the annular gap 73 and require stocking a large array of exactly fitted fitting 17 to conformably fit with the exterior wall of the tubing, or plastic conduit 21 in order to hold it in place. Otherwise, there was a tendency for the washers to be extruded through the gap 73. One advantage of this invention is that a single fitting may be employed with a plurality of tubing sizes without adverse consequences, since the shaped piece 71 employed as the washer does not tend to be extruded between the annular gap 73 between the tubing wall 21 and the fitting 17. Moreover, the shaped piece 71 has the interiorly accordioned walls within an external shield of molten plastic so as to have an inherent springingness that holds the fitting in place once it is frictionally tightened against the holding means 15 of the second conduit 13, as illustrated in FIG. 1. The mold 55 is ordinarily formed in a plurality of pieces, such as two halves, such that the halves can be moved apart to free the integrally formed tubing and washer.

A subsequent washer and tubing are formed by repeating the process described with respective FIGS. 6-9.

While threaded sections have been shown as the holding means for holding the fitting in the end of the plastic conduit in sealing relationship with the end of the second conduit 13, any other holding means, such as flanges or the like may be employed as long as they are constructed so as to take advantage of the washer that is integrally formed on the end of the plastic conduit so as to sealingly receive the end of the second conduit when compressed theragainst.

This invention has received widespread commercial acceptance, one company agreeing to take 800,000 units a month over the next year. The simplicity of the idea has caused experienced engineers to express wonderment that they had not come up with the idea. The simplicity in which the end of the second conduit is sealingly embedded in the integrally formed washer on the plastic conduit affords trouble-free and simple sealing interconnection and achieves all of the objects delineated hereinbefore and obviates the disadvantages of the prior art.

Although this invention has been described with a certain degree of particularity, it is understood that the present disclosure has been made only by way of example and that numerous changes in the details of construction and the combination and arrangement of parts may be resorted to without departing from the spirit and the scope of this invention.

What is claimed is:

1. A method of joining plastic conduit to a second conduit of another material comprising the steps of:
    a. forming a holding means on the end of said second conduit with which said plastic conduit is to be connected;
    b. emplacing about a tubular end of said plastic conduit a fitting that is adapted to be fitted against said holding means and having an interiorly protruding annular flange means for pulling said tubular end into engagement with said end of said second conduit;
    c. heating said tubular end of said plastic conduit to its softening temperature;
    d. forming from the softened tubular end of said plastic conduit a washer on said plastic conduit; said washer being formed of said plastic conduit so as to be integral therewith and fitting concentrically interiorly of said fitting and having shoulders stronger than the wall of said conduit; said washer being formed as a shaped piece by:
        i. accordioning said wall over a center piece maintaining the desired internal diameter and into a mold cavity having the desired exterior shape for the washer; and
        ii. compressing said accordioned wall back over the heating line formed between the heated, softened wall and the unsoftened wall so as to encompass said heating line and form a shaped piece that seals with said conduit and has inherent springingness to retain in place a frictionally tightened fitting; and
    e. tightening said fitting onto said holding means with said washer disposed interiorly of said fitting and with the end of said second conduit compressed into tight sealing relationship with said washer.

2. The method of claim 1 wherein a single fitting is employed with one of a plurality of plastic tubing walls having different outside diameters without said shaped piece being extruded through any annular gap between said interiorly protruding annular flange on said fitting and said tubing wall.

* * * * *